(12) United States Patent
Parker et al.

(10) Patent No.: US 7,590,717 B1
(45) Date of Patent: Sep. 15, 2009

(54) SINGLE IP ADDRESS FOR REDUNDANT SHELF PROCESSORS

(75) Inventors: Craig Parker, Kanata (CA); Craig Suitor, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 695 days.

(21) Appl. No.: 10/958,675

(22) Filed: Oct. 5, 2004

Related U.S. Application Data

(60) Provisional application No. 60/510,032, filed on Oct. 9, 2003.

(51) Int. Cl.
*G06F 15/173* (2006.01)
(52) U.S. Cl. .................. 709/223; 709/208; 709/229
(58) Field of Classification Search .......... 709/208, 709/221, 223, 224, 229
See application file for complete search history.

(56) References Cited

U.S. PATENT DOCUMENTS

| | | | |
|---|---|---|---|
| 6,550,029 B1* | 4/2003 | Bailey et al. ............... | 714/724 |
| 6,731,741 B1* | 5/2004 | Fourcand et al. ........ | 379/221.08 |
| 6,735,197 B1* | 5/2004 | Duschatko et al. .......... | 370/386 |
| 7,003,688 B1* | 2/2006 | Pittelkow et al. ............... | 714/7 |
| 7,043,663 B1* | 5/2006 | Pittelkow et al. ............... | 714/4 |
| 7,069,468 B1* | 6/2006 | Olson et al. .................... | 714/7 |
| 7,111,084 B2* | 9/2006 | Tan et al. ...................... | 710/15 |
| 7,127,633 B1* | 10/2006 | Olson et al. .................... | 714/4 |
| 7,242,862 B2* | 7/2007 | Saunders et al. .............. | 398/30 |

* cited by examiner

*Primary Examiner*—Salad Abdullahi
*Assistant Examiner*—El Hadji M Sall
(74) *Attorney, Agent, or Firm*—Guerin & Rodriguez LLP; William G. Guerin

(57) ABSTRACT

Described is a network element for a communications network. Management communications with the network element occur using a single IP address. The network element includes two shelf processors each having a negotiations module. One of the shelf processors has a master status and the other shelf processor has a slave status. A backplane in communication with the shelf processors allows the negotiations modules to exchange data and to determine whether one of the shelf processors has experienced a fault. If a fault is determined in the master shelf processor, the slave shelf processor becomes the master shelf processor and the master shelf processor becomes the slave shelf processor.

4 Claims, 3 Drawing Sheets

SINGLE IP ADDRESS FOR REDUNDANT SHELF PROCESSORS

CROSS-REFERENCE TO RELATED APPLICATIONS

This application claims the benefit of U.S. provisional patent application Ser. No. 60/510,032, filed Oct. 9, 2003, titled "Single IP Address for Redundant Shelf Processors", the entirety of which provisional application is incorporated by reference herein.

FIELD OF THE INVENTION

The invention relates generally to management of network elements in a communications network. More particularly, the invention relates to a method for providing a redundant IP address for a network element that does not result in increased management complexity.

BACKGROUND

Transport network elements are used to interface client transport traffic to a communications network. Such equipment must be highly reliable to ensure that important data is not degraded or lost. Typically a network element is a communications shelf having cards to perform various signal management functions. Each communications shelf usually includes a shelf processor (e.g., shelf processor card) which manages commissioning of the shelf and the provisioning of other cards in the shelf. The shelf processor also coordinates the functionalities provided by the other shelf cards during normal operation.

Management of the network element includes monitoring and reconfiguring the network element as necessary. For example, the network element has the ability to report various performance parameters and alarms relating to signal quality and facility status. Management of the network element is typically achieved through communications between the shelf processor and a user at a remote management device (e.g., a personal computer (PC)) over a management network. The management network is generally distinct from the transport network in which the network element is a node. For example, the management network can be part of an internal data network controlled by the operator of multiple network elements.

In order to provide a high degree of reliability to network elements, it is desirable to include a second shelf processor in a communications shelf, especially as the bandwidth of the data traffic controlled by network elements continues to increase. The second shelf processor is intended to be a slave (backup) shelf processor to the master (primary) shelf processor during normal operation. In the event that the master shelf processor is unable to perform normally, the slave shelf processor assumes the role of the master shelf processor and the original master shelf processor is removed from active status. A separate OAM (operations, administration and maintenance) IP (internet protocol) address can be used for each shelf processor; however, switching to the slave shelf processor requires that a user initiate the change to the second OAM IP address.

What is needed is a method for managing the communications shelf that is independent of which shelf processor is in master status. The method should not substantially increase the complexity of the management task.

SUMMARY OF THE INVENTION

In one aspect, the invention features a method for communicating over a management network with a network element in a communications network. The network element includes a first processor and a second processor. The method includes operating the first processor as a master processor and the second processor as a slave processor. The first processor is responsive to data provided at a port in the network element from a user over a management network. The method also includes configuring the first processor to operate as a slave processor and configuring the second processor to operate as a master processor. The second processor is responsive to data provided at the port after the configuring of the first and second processors.

In another aspect, the invention features a network element addressable by a single IP address. The network element includes a first shelf processor having a negotiations module and one of a master status or a slave status, and a second shelf processor having a negotiations module and the other of a master status and a slave status. The network element also includes a backplane in electrical communication with the first and second shelf processors to provide data between the negotiations modules. The negotiations modules determine whether one of the first and second shelf processors has experienced a fault.

In another aspect, the invention features a management network for controlling a network element in a communications network. The management network includes a network element for managing client traffic in the communications network. The network element includes a first processor having one of a master status and a slave status, a second processor having the other of a master status and a slave status and a backplane in electrical communication with the first and second processors. The first and second processors determine which of the processors is to have the master status. The management network also includes a management device in communication with the network element through an OAM network. The management device provides management commands to one of the first and second processors based on which processor has master status.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
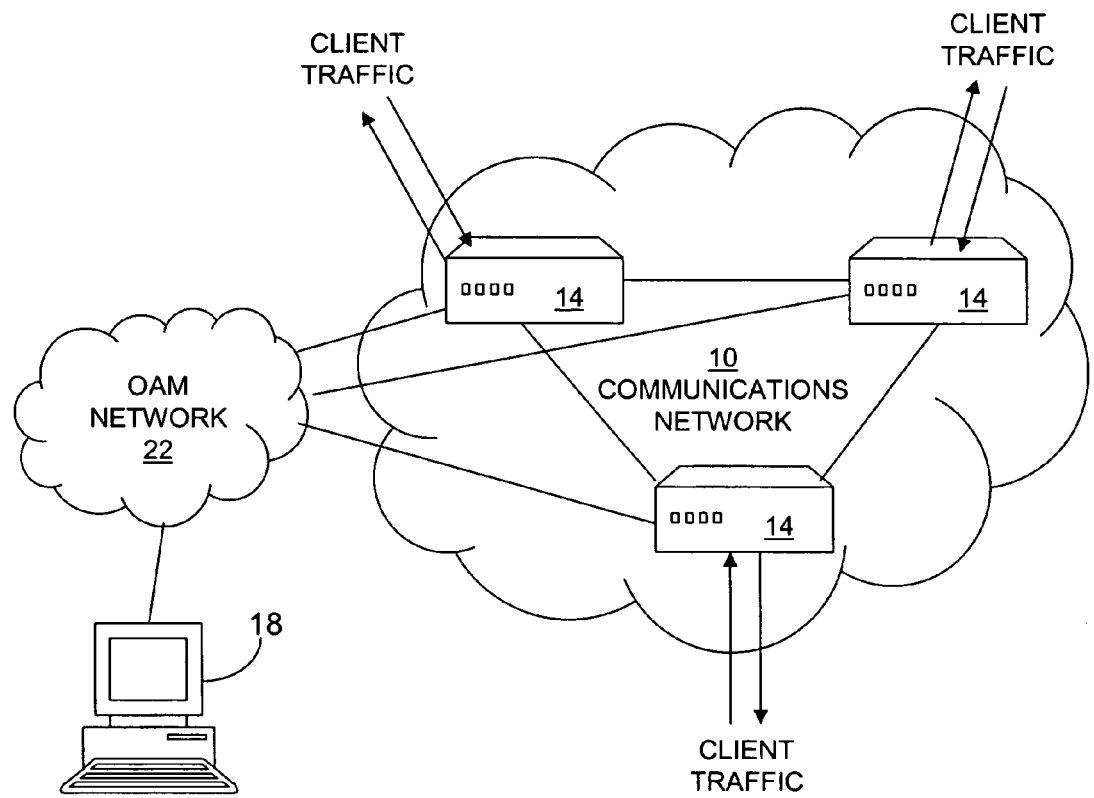
FIG. 1 is a representation of a network environment in which one or more communications shelves are configured according to an embodiment of the invention.

FIG. 1 illustrates a communications network 10 that includes a number of network elements, or communications shelves, 14 (only three shown for clarity), communication paths and other network components (not shown). The depicted communications shelves 14 interface client transport traffic with the communications network 10. Typically, each communications shelf 14 includes a number of shelf cards having various functionalities. Client communications traffic is introduced through one of the communications shelves 14, transmitted along one or more communications paths, and delivered to a client by another of the communications shelves 14. The communications shelves 14 and their resources are managed by a remote device 18 (e.g., a personal computer (PC)) through an OAM network 22 that is typically independent of the data communications network 10. Management includes issuing commands, such as TL1 (Transaction Language 1) commands, from the remote device 18 to the communications shelves 14. Each communication shelf 14 includes one or more Ethernet ports for coupling to the OAM network 22.

Figure 2:
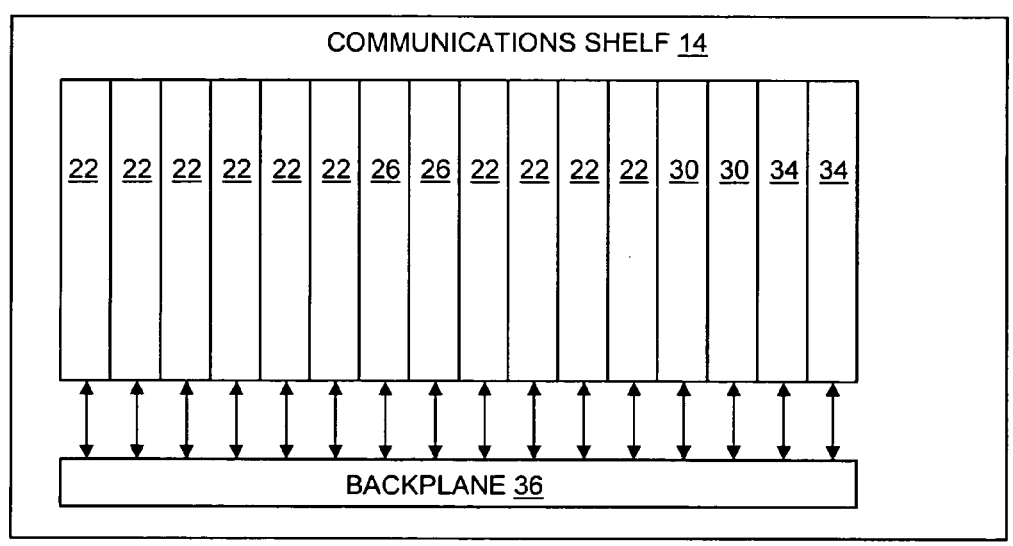
FIG. 2 is a block diagram depicting a communications shelf having redundant shelf processors according to an embodiment of the invention.

A block diagram of a representative communications shelf 10 is shown in detail in FIG. 2. The communications shelf 14 includes various shelf cards, including tributary cards 22 to multiplex and demultiplex client traffic with the communications network 10, cross-connect cards 26 to route traffic between different cards in the communications shelf 14, protection switching cards 30 and two shelf processor cards 34. The shelf processor cards 30 communicate with each of the other cards and each other over a shelf backplane 36.

Figure 3:
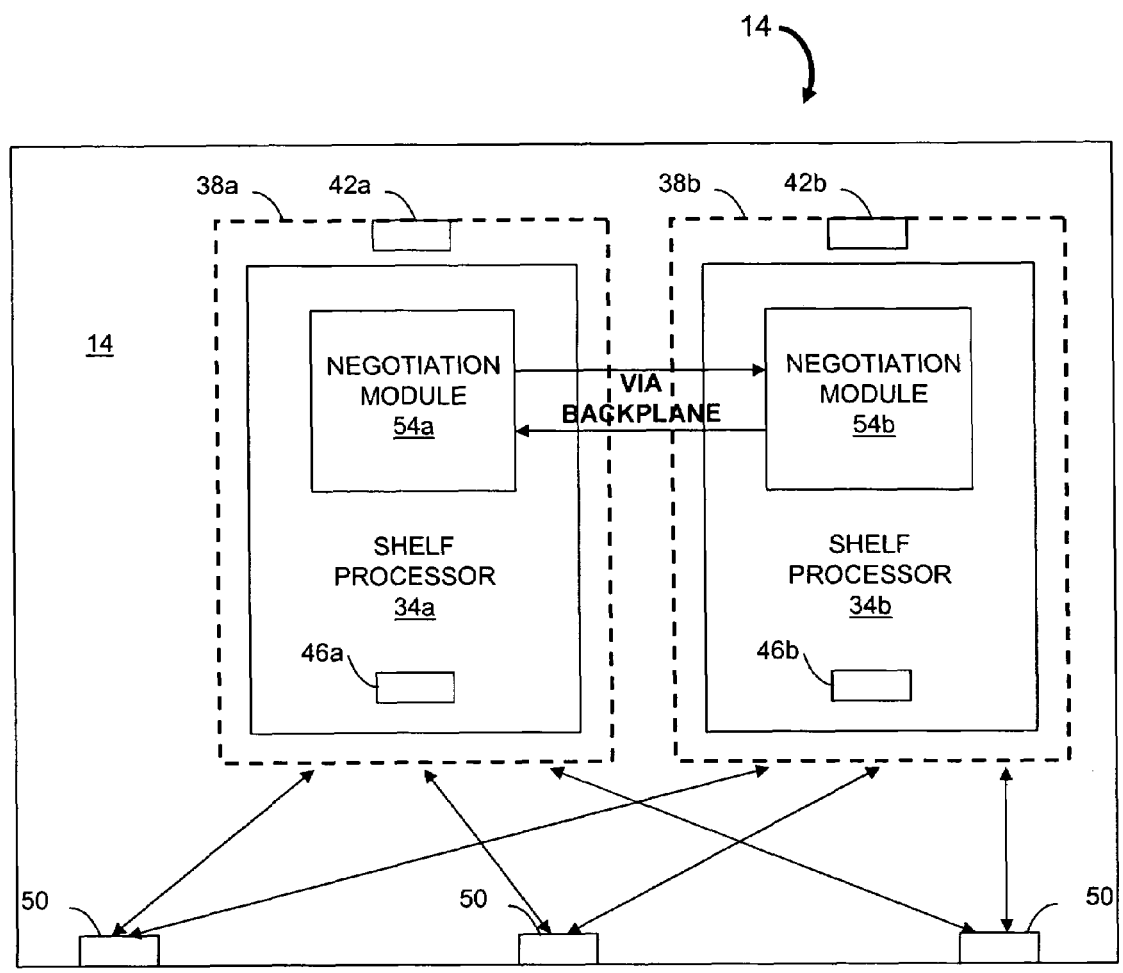
FIG. 3 is a block diagram depicting the redundant shelf processors in the communications shelf of FIG. 2.

FIG. 3 is a block diagram showing details of the shelf processors 34 depicted in FIG. 2. The components associated with each of the shelf processors 34 are designated by one of the letters "a" and "b". Each shelf processor 34 resides in a dedicated shelf slot 38 in the communications shelf 14.

OAM management data is made available to each shelf processor 34 through a variety of ports. In the illustrated embodiment, each shelf slot 38 includes an Ethernet slot port 42 through which OAM data is passed when the shelf processor 34 is present in its slot 38. Generally, each Ethernet slot port 42 is coupled to a router. In addition, each shelf processor 34 includes an Ethernet port 46 on its front panel for direct coupling to a management device. The front panel Ethernet ports 46 provide a convenient means to provision each shelf processor 34 and to perform troubleshooting of the communications shelf 14 as deployed in the field. The illustrated communications shelf 14 also includes three switchable Ethernet ports 50 which can be coupled to either shelf processor 34 according to signals generated by a negotiations module 54 of either shelf processor 34 or according to commands issued by the user at the remote management device. The negotiations modules 54 communicate with each other over the backplane of the communications shelf 14. Advantageously, the switchable Ethernet ports 50 eliminate the need to provide individual links to each shelf processor 34; however, the presence of the two Ethernet slot ports 42 allows for redundant paths in the event that a single link established with a switchable Ethernet port 50 fails.

During normal operation, only one of the shelf processors 34 (i.e., the master processor) controls the operation of the communications shelf 14. For example, the shelf processor 34a may be the master processor. Because there can be only one current master processor, the other shelf processor 34b, i.e., the slave processor, remains in standby mode as long as the master processor 34a continues to operate normally. If the master processor 34a experiences a fault (e.g., fails to operate or an error occurs during operation), the slave processor 34b becomes the master processor. Thus, according to the example, if a fault is determined for the original master shelf processor 34a, it is removed from master status and the other shelf processor 34b becomes the master processor.

According to the present invention, the switchover between master status and slave status does not require a second OAM IP address. Advantageously, the OAM IP address for the master shelf processor is independent of which shelf processor 34 is active and the user managing the network element is not necessarily aware of the specific master/slave relationship of the shelf processors 34. It should be recognized that in other embodiments more than two shelf processors 34 can be utilized. In such embodiments only one of the processors 34 has master status at a given time.

Figure 4:
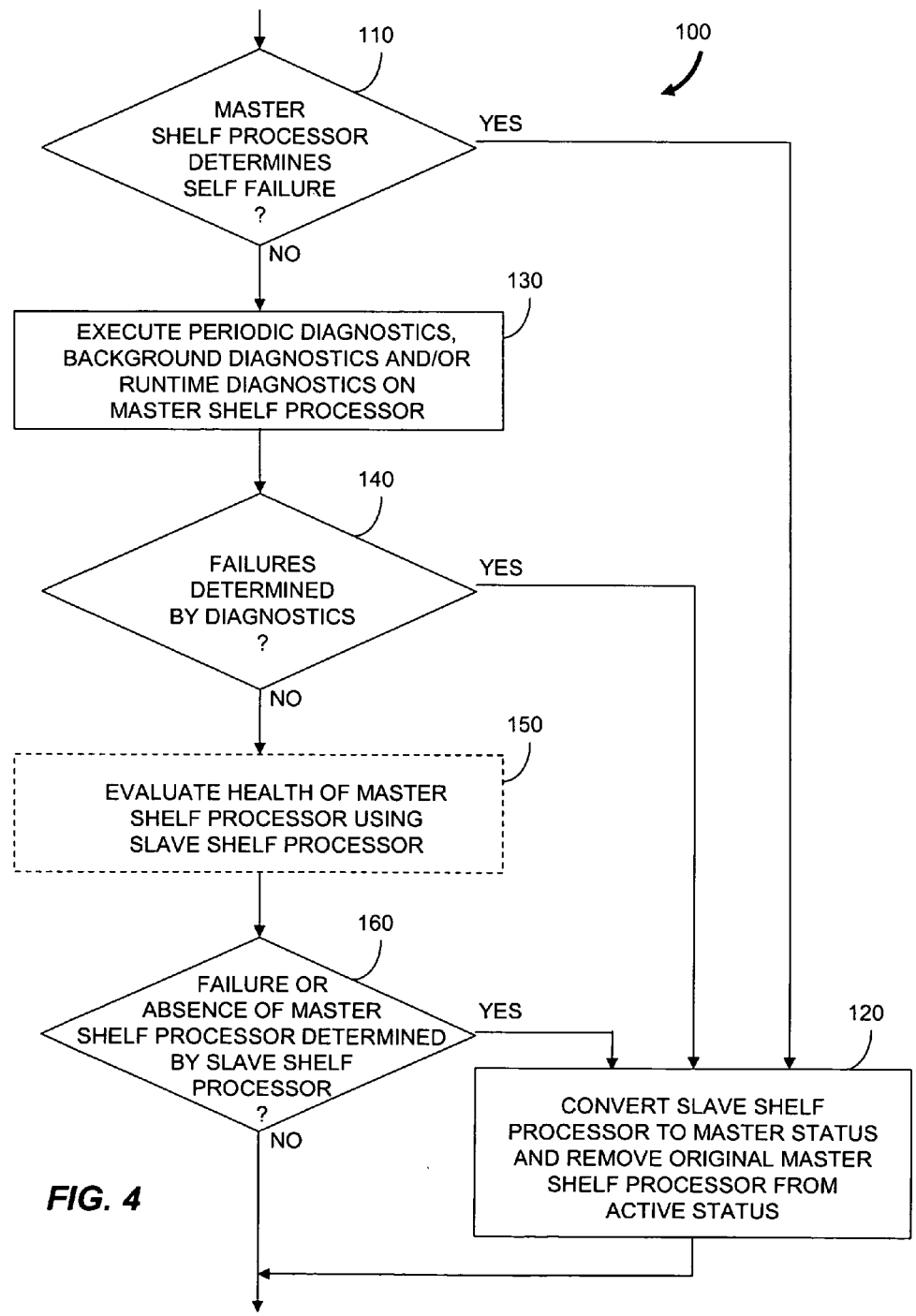
FIG. 4 is a flowchart representation of an embodiment of a method for controlling redundant shelf processors in accordance with the invention.

FIG. 4 illustrates an embodiment of a method for controlling redundant shelf processors 34 according to the invention. Referring to FIG. 3 and FIG. 4, the negotiation modules 54 communicate with each other to determine which of the two shelf processors 34 has master status and to ensure that there is only one master shelf processor at a time. If, for example, shelf processor 34a is in master status, its negotiation module 54a determines (step 110) whether one or more failures have occurred and directs (step 120) the other shelf processor 34b to become the master shelf processor, if necessary. Failures can also be detected by executing (step 130) diagnostics periodically, in the background or at runtime to determine (step 140) if various components (e.g., processor hardware, RAM, flash memory, and associated Ethernet switches) on the master shelf processor card have failed. Alternatively, the negotiations module 54b in the slave shelf processor 34b evaluates (step 150) the health of the master shelf processor 34a and, if it is determined (step 160) that the master shelf processor 34a is failing or is absent from its shelf slot 38a, responds by instating (step 120) the slave shelf processor 34b as the new master shelf processor. The negotiation modules 54 control the operation of the switchable Ethernet ports 50 and thus ensure that the TL1 commands transferred over the OAM network 22 are provided to the current master processor. In addition, the negotiation modules 54 determine whether to process any received TL1 commands received at the other Ethernet ports 42, 46 or direct them to the other shelf processor 34.

A user can provide commands from a remote management device 18 to toggle the master/slave status of the redundant shelf processors 34. Similarly, the user can change the master/slave status of the two shelf processors 34 to perform troubleshooting of the shelf processors 34 or the communications shelf 14.

Regardless of how the master/slave status switchover is initiated, subsequent communications using the single OAM IP address for the active shelf processor are processed by the shelf processor 34 having master status. Advantageously, the OAM IP address is not limited to a single port at the network element. Instead, the data sent according to the OAM IP address can be received at any number of interface ports in the communications shelf 14 and be switched to the master shelf processor under the control of the negotiation modules 54. In addition, data received on a dedicated port (e.g., front panel Ethernet port 46) of a shelf processor 34 is processed directly if the shelf processor 34 is in master status or is provided to the other shelf processor 34 over the shelf backplane if the receiving shelf processor 34 is in slave status. Consequently, the need to use a separate OAM IP address for each shelf processor 34 is eliminated.

While the invention has been shown and described with reference to specific preferred embodiments, it should be understood by those skilled in the art that various changes in form and detail may be made therein without departing from the spirit and scope of the invention as defined by the following claims. For example, although a total of two shelf processors and seven Ethernet ports are shown in one illustrated embodiment, it should be recognized that the principles of the invention apply to a network element having greater numbers of redundant shelf processors and any number of redundant ports for OAM management.

What is claimed is:

1. A management network for controlling a network element in a communications network, the management network comprising:
   a network element for managing client traffic in the communications network, the network element comprising:
      a backplane:
      a first shelf processor having a negotiations module and having one of a master status and a slave status;
      a second shelf processor having a negotiations module and having the other of a master status and a slave status, the negotiations modules of the first and second shelf processors being in communication with each other through the backplane and determining which one of the shelf processors has the master status based on a determination that one of first and second shelf processors fails to operate, experiences an error during operation or is absent from a slot in the network element; and
      a switchable port controllable by at least one of the negotiations modules to be in communication with the shelf processor having the master status; and
   a remote management device in communication with the switchable port through an operations, administration and maintenance network, the remote management device providing management commands to the shelf processor having the master status.

2. The management network of claim 1 wherein the switchable port is a switchable Ethernet port addressable by a single Internet Protocol address.

3. The management network of claim 1 wherein the first shelf processor is configured for execution of diagnostics to determine if at least one of the first shelf processor and the second shelf processor fails to operate, experiences an error during operation or is absent from a slot in the network element.

4. The management network of claim 1 wherein the second shelf processor is configured for execution of diagnostics to determine if at least one of the first shelf processor and the second shelf processor fails to operate, experiences an error during operation or is absent from a slot in the network element.

* * * * *

UNITED STATES PATENT AND TRADEMARK OFFICE
CERTIFICATE OF CORRECTION

PATENT NO.       : 7,590,717 B1                    Page 1 of 1
APPLICATION NO.  : 10/958675
DATED            : September 15, 2009
INVENTOR(S)      : Parker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Twenty-first Day of September, 2010

David J. Kappos
*Director of the United States Patent and Trademark Office*